P. B. CRANE.
QUACK GRASS AND WEED ERADICATOR.
APPLICATION FILED JAN. 24, 1911.
1,063,660.
Patented June 3, 1913.
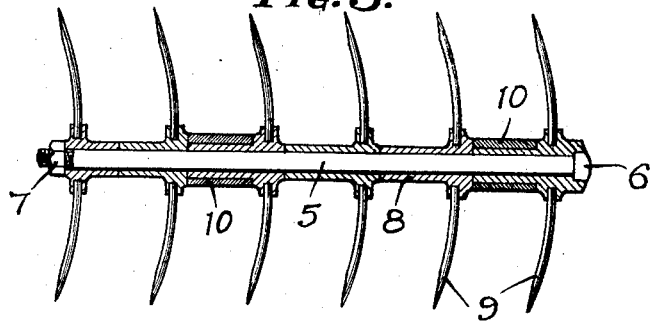
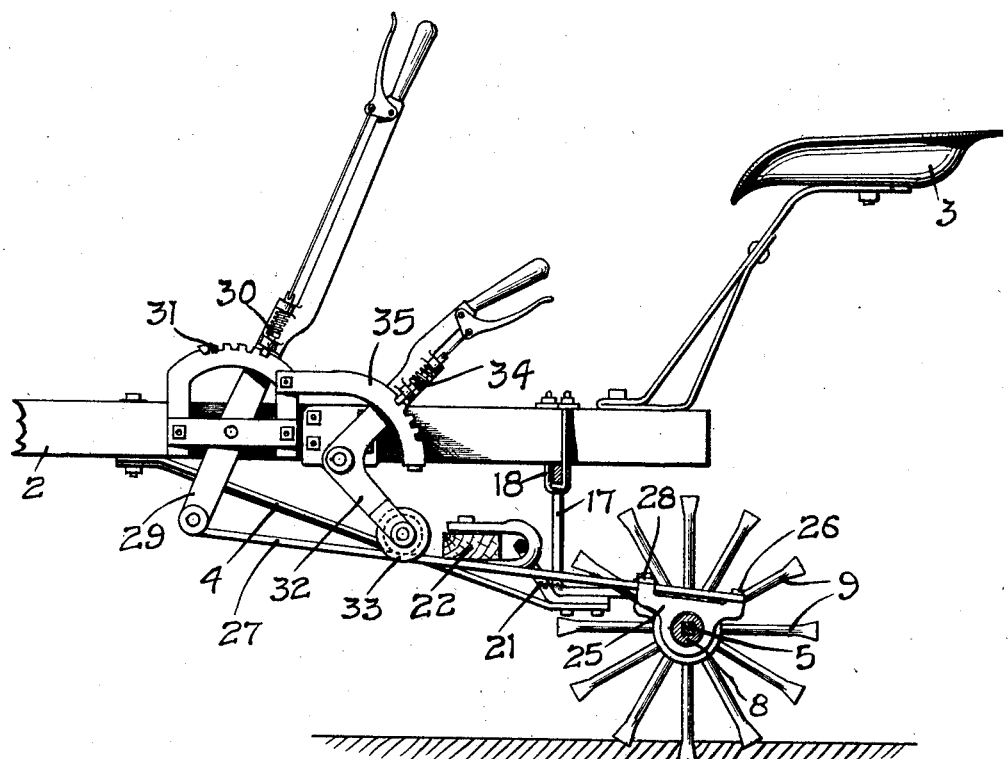

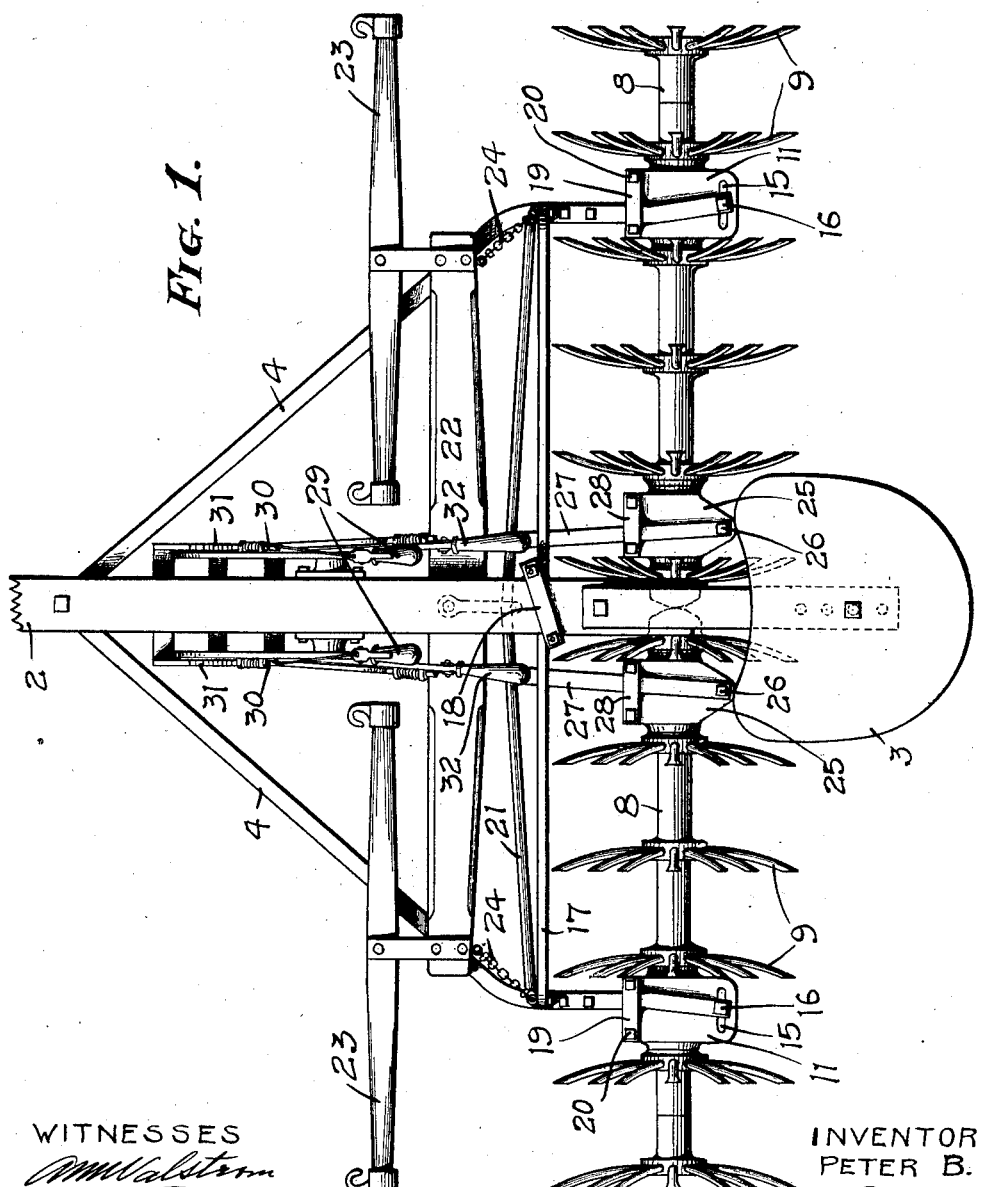

P. B. CRANE.
QUACK GRASS AND WEED ERADICATOR.
APPLICATION FILED JAN. 24, 1911.

1,063,660.

Patented June 3, 1913.

3 SHEETS—SHEET 3.

WITNESSES

INVENTOR
PETER B. CRANE.
BY Paul & Paul
ATTORNEYS

UNITED STATES PATENT OFFICE.

PETER B. CRANE, OF LONG LAKE, MINNESOTA.

QUACK-GRASS AND WEED ERADICATOR.

1,063,660.   Specification of Letters Patent.   Patented June 3, 1913.

Application filed January 24, 1911. Serial No. 604,459.

*To all whom it may concern:*

Be it known that I, PETER B. CRANE, of Long Lake, Hennepin county, Minnesota, have invented certain new and useful Improvements in Quack-Grass and Weed Eradicators, of which the following is a specification.

The object of my invention is to provide a machine having tines adapted to penetrate the soil and operating laterally therein to drag out the quack grass or weed roots, separate them from the earth and finally throw the roots to one side on the surface of the ground.

A further object is to provide improved draft connections and improved means for applying pressure to force the tines into the ground.

Other objects of the invention will appear from the following detailed description.

The invention consists generally in wheels having a series of tines which are curved laterally with respect to the direction of movement of the machine.

Further the invention consists in a combined leaf spring and draw-bar.

Further the invention consists in arranging the draft connections near the wheels with the curved tines.

Further the invention consists in improved connections for the outer draft bars with the axles of the wheels.

Further the invention consists in various constructions and combinations, all as hereinafter described and particularly pointed out in the claims.

Figure 4:
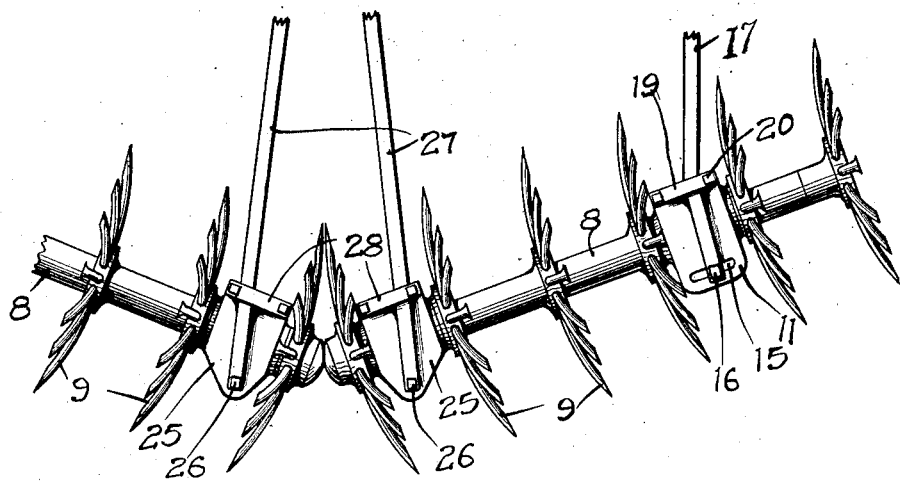
Figure 5:
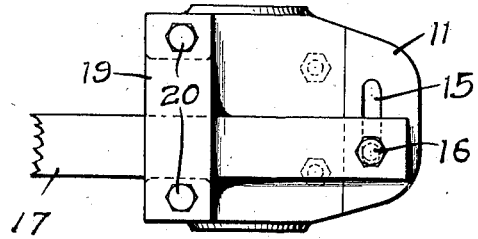
Figure 6:
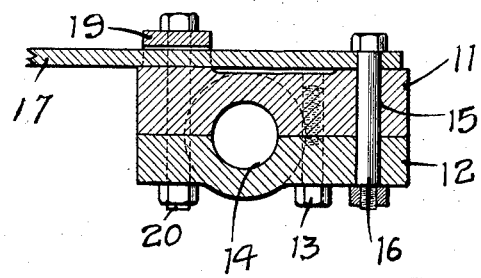

In the accompanying drawings forming part of this specification, Figure 1 is a plan view of a machine embodying my invention, Fig. 2 is a vertical sectional view of the same, Fig. 3 is a detail sectional view illustrating the manner of mounting the wheels on the axle, Fig. 4 is a detail view showing the manner of tilting the axles to set the wheels at varying angles with respect to the draft line of the machine, Figs. 5 and 6 are detail views of the boxes by means of which connection is made between the draft bars and the wheel axles.

In the drawing, 2 represents the pole of the machine, having a seat 3 mounted on its rear end and 4 represents draw-bars secured at their forward ends on the pole and extending backwardly therefrom and attached by an improved construction to the axles of the wheels. The axles are formed by rods 5, preferably square in cross section, as shown in Figs. 2 and 3. There are two of these rods, one on each side of the center of the machine, each having a head 6 at one end and the opposite end threaded to receive a nut 7. The hubs 8 of the wheels have holes therethrough to receive the rod and are securely locked thereon by the nut 7. As shown in Fig. 3, the hubs have long bearing surfaces on the rod and are of substantially the same length, except those at the outer end of the axle or rod where, as shown in Fig. 3, the adjoining hubs are divided, each having, however, a sufficient bearing on the axle to hold them in place thereon.

In each hub I mount a series of curved tines 9, spaced apart a suitable distance and outwardly curved, and having sharpened outer ends that are adapted to penetrate the soil and pull or drag out the grass roots as the wheels revolve, the shape of the tines causing the roots to be moved laterally and separated from the earth and finally thrown out on the top of the ground. The tines as shown in the drawings are curved continuously from the points where they leave the hubs to the ends of the tines, their curve being gradual so that when the points enter the ground in a direction at right angles substantially to the direction of movement of the machine, they will dislodge the grass roots which will follow the gradual curve of the tine shanks upwardly out of the ground and be deposited on the surface. These tines preferably have flattened ends forming cutting edges operating in line substantially with the direction of movement of the machine, and the shanks of the tines are comparatively narrow and have curved or rounded faces or surfaces which receive the quack grass roots from the cutting edges and direct them upwardly on to the top of the ground. These narrow shanks operate as the tines of a fork to dislodge and sift the grass roots from the soil without throwing out any considerable portion of the soil itself. This lateral dragging of the roots and the subsequent disposition of them may be effected to a greater degree by oscillating the axles so that the wheels will travel at a greater angle to the draft line of the machine. This is indicated plainly in Fig. 4. In other words, by swinging the axles on the drag bars, the tines will be rendered more effective for stirring up and loosening the soil and tearing out the grass and weed roots.

The tines may be made of any suitable length and any desired number of them arranged around the hubs. The inner end of each axle is provided with a bearing sleeve 10, a similar sleeve being provided at the outer end of the axle, and on the outer sleeves boxes are mounted consisting, preferably, of an upper section 11 and a lower section 12 secured together by bolts 13, said sections having a bearing 14 for the sleeve 10, and a transverse slot 15 through which the bolts 16 pass and through the rearwardly turned ends of a bail 17 which is secured to the rear of the pole by a clevis 18. The bail has bearings on the forward portion of the boxes by means of plates 19 and bolts 20 which pass through said plates and secure them to the boxes, guideways being formed between the upper sections 11 of the boxes and the plates 19 to allow the boxes to oscillate on the bail and accommodate themselves to the adjustment of the axles and wheels. The rear ends of the drag bars 4 are secured to the bail 17 and a yoke 21 has its ends secured to the bail and the drag bars and carries an evener 22 having the usual swingle trees 23 at each end. The yoke 21 is arranged close to the wheels and the draft is therefore applied much nearer to the work than usual in machines of this kind. The bail 17, as shown plainly in Fig. 2, is preferably located near the driver's seat and the weight of the pole and the driver is transmitted through this bail to the boxes at the outer ends of the axles and tends to force the tined wheels into the soil, the application of the weight being positive and direct. The ends of the evener 22 have flexible connections 24 with the ends of the bail to aid in turning the machine. Boxes are provided at the inner ends of the axles, as indicated in Fig. 4, and these boxes I will designate by reference numeral 25 having pivots 26 for the rear ends of the leaf spring draw-bars 27 and guides 28 corresponding to those on the outer boxes, which permit the inner ends of the axles to oscillate horizontally on the spring bars 27. The angle of the axles with respect to the direction of movement of the machine is controlled by these leaf drawbars, which are operated by levers 29 pivoted on each side of the pole and having locking latches 30 to engage rack bars 31. By the movement of these levers the axles and wheels are swung back and forth in a horizontal plane to adjust the axles in line with one another or at the desired angle with respect to the draft line.

For the purpose of forcing the inner ends of the axles and the wheels downwardly into the soil, I provide bell crank levers 32 also pivoted on the pole and having anti-friction wheels 33 which contact with the leaf draw-bars so that by the oscillation of these levers the tension of these bars can be increased or decreased to force the inner tined wheels into the soil or allow them to rise out of the soil. These levers are provided with locking latches 34 and rack bars 35.

In the operation of this machine, the wheels are set at the desired angle with respect to the draft line and the weight of the rider, supplemented by the weight of the pole, upon the bail 17 will force the outer wheels into the soil and the bail will operate as a fulcrum, and the forward portion of the pole will be raised, relieving the weight on the neck yoke. The driver will then flex the draw-bar springs by the operation of their levers until the inner wheels are forced into the soil a distance corresponding to the outer wheels and as the machine moves along the tines will drag the grass roots laterally in the soil, separate them from the earth, and as the tines move out of the soil the roots will be thrown back upon the surface. The angle of the wheels with respect to the direction of movement of the machine and the curvature of the tines will dig the soil and effectually remove therefrom all grass and weed roots which the ordinary disk wheel will not do.

I have shown the edge of the tines wedge or chisel-shaped, but they may be pointed, or any other suitable form without departing from the spirit of my invention.

The tined wheel shown and described in this application forms the subject matter of my divisional application filed June 28th, 1912, Serial No. 706,397.

I claim as my invention:—

1. A machine of the class described comprising a pair of axles arranged end to end, wheels mounted thereon, a draft pole above the abutting ends of said axles, drag bars connecting said pole and axles, a transverse yoke having its ends secured to said drag bars near said axles, and an evener centrally mounted on said yoke, whereby the draft will be applied thereon near said wheels.

2. In a machine of the class described, axles and wheels mounted thereon, boxes carried by said axles, each box consisting of an upper and a lower section and bolts securing them together, drag bars pivotally mounted on the rear bolts of said box and straps secured by the forward bolts of said box and spaced from the upper portions thereof forming guide ways to receive said drag bars and permit horizontal oscillation of said axles and wheels.

3. A machine of the class described comprising axles, wheels mounted thereon, a draft pole connected with said axles, leaf spring drag bars connected at their forward ends to said pole and at their rear ends to said axles and means for applying pressure to said drag bars between said ends to force said wheels into the soil.

4. A machine of the class described comprising axles, wheels therefor, a draft pole, a seat thereon, drag bars connecting said pole with the outer portions of said axles, leaf spring drag bars connecting the inner portions of said axles with said pole, and levers mounted on said pole and having means for engaging the middle portions of said leaf spring drag bars for putting the same under tension and depressing the inner ends of said axles.

5. A machine of the class described comprising axles placed end to end, wheels mounted thereon, a draft pole having a driver's seat, drag bars connecting said pole with the outer portions of said axles, leaf spring drag bars attached to the inner portions of said axles, levers mounted on said pole and connected to the forward ends of said leaf spring drag bars for oscillating said axles in a horizontal plane, and means between said levers and said axles for flexing said leaf spring drag bars to depress the inner ends of said axles and force the inner wheels into the soil.

In witness whereof, I have hereunto set my hand this 19th day of January, 1911.

PETER B. CRANE.

Witnesses:
GENEVIEVE E. SORENSEN,
EDWARD A. PAUL.

Copies of this patent may be obtained for five cents each, by addressing the "Commissioner of Patents, Washington, D. C."